United States Patent
Harakawa et al.

(10) Patent No.: US 8,378,601 B2
(45) Date of Patent: Feb. 19, 2013

(54) CONTROL APPARATUS FOR PERMANENT MAGNET SYNCHRONOUS MOTOR

(75) Inventors: Masaya Harakawa, Tokyo (JP); Keita Horii, Tokyo (JP); Atsuo Haishi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 204 days.

(21) Appl. No.: 13/060,611

(22) PCT Filed: Oct. 29, 2008

(86) PCT No.: PCT/JP2008/069674
§ 371 (c)(1),
(2), (4) Date: Feb. 24, 2011

(87) PCT Pub. No.: WO2010/050020
PCT Pub. Date: May 6, 2010

(65) Prior Publication Data
US 2011/0148335 A1    Jun. 23, 2011

(51) Int. Cl.
*H02P 21/00* (2006.01)
*H02P 6/00* (2006.01)
*H02P 7/00* (2006.01)
*H02P 27/00* (2006.01)
*G05B 11/28* (2006.01)

(52) U.S. Cl. ............. 318/400.02; 318/400.01; 318/432; 318/434; 318/599; 318/811

(58) Field of Classification Search ............ 318/400.01, 318/400.02, 432, 434, 599, 811
See application file for complete search history.

(56) References Cited

U.S. PATENT DOCUMENTS

| | | | | |
|---|---|---|---|---|
| 5,854,547 A | * | 12/1998 | Nakazawa | 318/716 |
| 6,809,492 B2 | | 10/2004 | Harakawa et al. | |
| 2004/0061461 A1 | * | 4/2004 | Tajima et al. | 318/254 |
| 2004/0135533 A1 | | 7/2004 | Harakawa et al. | |
| 2006/0113949 A1 | * | 6/2006 | Nishimura et al. | 318/723 |
| 2007/0096672 A1 | * | 5/2007 | Endo et al. | 318/432 |
| 2008/0061726 A1 | * | 3/2008 | Iwaji et al. | 318/723 |

FOREIGN PATENT DOCUMENTS

| | | |
|---|---|---|
| JP | 10-243699 A | 9/1998 |
| JP | 2000-116198 A | 4/2000 |
| JP | 04-507493 B2 | 5/2010 |
| KR | 10-2003-0040231 A | 5/2003 |
| WO | 03/009463 A1 | 1/2003 |

OTHER PUBLICATIONS

Korean Office Action, dated Jun. 25, 2012.

* cited by examiner

*Primary Examiner* — Walter Benson
*Assistant Examiner* — Gabriel Agared
(74) *Attorney, Agent, or Firm* — Sughrue Mion, PLLC (57) ABSTRACT

A control apparatus for a permanent magnet synchronous motor capable of performing highly accurate torque control not only during low-speed operation and medium-speed operation but also during high-speed operation without increasing a burden on a product CPU irrespective of whether the permanent magnet synchronous motor is an SPM motor or an IPM motor. The control apparatus includes a torque correction circuit that generate a torque correction command from a current phase of current correction commands on a d-axis and a q-axis and a torque command and supplies the torque correction command to a d/q-axis current command generator instead of the torque command.

6 Claims, 7 Drawing Sheets

CONTROL APPARATUS FOR PERMANENT MAGNET SYNCHRONOUS MOTOR

TECHNICAL FIELD

The present invention relates to a control apparatus for a permanent magnet synchronous motor.

BACKGROUND ART

In control of a permanent magnet synchronous motor, vector control that can flexibly control torque is often used. A control apparatus employing the vector control adopts a configuration in which a PWM inverter decomposes a three-phase motor current, which is output to the permanent magnet synchronous motor, onto a dq-axis coordinate, i.e., rotating orthogonal two axes, and converts the three-phase motor current into a d-axis current as an excitation current component and a q-axis current as a torque contribution component. A current controller, which performs proportional integral control, controls the PWM inverter such that the converted d-axis current and q-axis current actually flowing to the permanent magnet synchronous motor follow a d-axis current command and a q-axis current command generated from a torque command externally given.

Therefore, accuracy of torque control by the control apparatus for the permanent magnet synchronous motor depends on whether an appropriate d-axis current command and an appropriate q-axis current command can be generated in a d/q-axis current command generator, which generates the d-axis current command and the q-axis current command from the torque command externally given.

A torque generation formula in an SPM (Surface Permanent Magnet) motor having no saliency, which is one of permanent magnet synchronous motors, is given by Formula (1). In Formula (1), $T_m^*$ represents the torque command externally given, $i_q^*$ represents the q-axis current command, and $K_t$ represents a torque constant of the permanent magnet synchronous motor.

$$T_m^* = K_t i_q^* \quad (1)$$

If Formula (1) is transformed as in the following Formula (2) and the d/q-axis current command generator is configured to carry out a calculation based on Formula (2), it is possible to control torque. In Formula (2), $i_d^*$ represents the d-axis current command.

$$\left. \begin{array}{l} i_d^* = 0 \\ i_q^* = T_m^*/K_t \end{array} \right\} \quad (2)$$

A torque generation formula in an IPM (Interior Permanent Magnet) motor having saliency, which is one of permanent magnet synchronous motors, is given by the following Formula (3). In Formula (3), $P_m$, $L_d$, and $L_q$ respectively represent the number of pole pairs, d-axis inductance, and q-axis inductance of the permanent magnet synchronous motor.

$$T_m^* = K_t i_q^* + P_m(L_d - L_q) i_d^* i_q^* \quad (3)$$

For the IPM motor, if the d/q-axis current command generator is configured to carry out a calculation based on Formula (3) or refer to table data based on Formula (3) prepared in advance, it is possible to control torque. Because it is generally known that the d-axis inductance and the q-axis inductance nonlinearly change according to the magnitude of an electric current, it is also possible to improve the accuracy of the torque control by configuring the d/q-axis current command generator taking that into account.

In recent years, to cause the permanent magnet synchronous motor to operate at high speed, operation in a constant output region where an inverter output voltage is fully consumed is increasing. In this operation, because it is necessary to suppress saturation of the inverter output voltage, so-called field weakening control for increasing the d-axis current in the negative direction is often performed as means for suppressing the saturation of the inverter output voltage.

A method of the field weakening control is described in Patent Document 1 (FIG. 11). If this method is applied to the control apparatus for the permanent magnet synchronous motor, the configuration will be as follows. A q-axis voltage saturation amount is calculated from a deviation between a q-axis voltage component and a q-axis voltage command and a d-axis current correction amount is calculated from the calculated q-axis voltage saturation amount and rotational angular velocity. A d-axis voltage saturation amount is calculated from a deviation between a d-axis voltage component and a d-axis voltage command and a q-axis current correction amount is calculated from the calculated d-axis voltage saturation amount and rotational angular velocity. Current commands on the d-axis and the q-axis output by the d/q-axis current command generator are corrected using the calculated current correction amounts on the d-axis and the q-axis. With this configuration, both of torque control in the permanent magnet synchronous motor and stable operation in a high-speed operation region can be achieved. Therefore, it is possible to suppress occurrence of voltage saturation during the high-speed operation, realize stable operation, and significantly improve stability of control.

Patent Document 1: International Publication No. 03/009463

Patent Document 2: Japanese Patent Application Laid-open No. 2000-116198

DISCLOSURE OF INVENTION

Problem to be Solved by the Invention

However, concerning the accuracy of the torque control in the field weakening control, problems rarely occur because the SPM motor, which is one of permanent magnet synchronous motors, is often used. However, in recent years, problems occur because the IPM motor, in which the problem of magnet peeling does not occur, is often used in accordance with the increase of the high-speed operation in permanent magnet motors.

In the SPM motor, because generation of torque is based on Formula (1), even if the current commands on the d-axis and the q-axis output from the d/q-axis current command generator are corrected afterwards, only a change in the q-axis current command affects the accuracy of the torque control. Therefore, deterioration in the accuracy of the torque control does not reach a level that causes a problem in actual use.

However, in the IPM motor, because generation of torque is based on Formula (3), when the current commands on the d-axis and the q-axis output from the d/q-axis current command generator are corrected afterwards, changes in both the current commands affect the accuracy of the torque control. Therefore, in some case, the accuracy of the torque control is deteriorated more than the deterioration in the toque control during the use of the SPM motor.

It is also generally known that, in the IPM motor, operation efficiency can be improved by feeding an appropriate d-axis current corresponding to an operation state. Therefore, in some case, the d-axis current command output from the d/q-axis current command generator is corrected for the purpose of improving the operation efficiency of the IPM motor. In this case, the accuracy of the torque control slightly falls not only in the high-speed operation but also in low-speed operation and medium-speed operation.

To deal with this problem, for example, in Patent Document 2 (a fourth embodiment), a method for stably outputting maximum torque under a condition that a motor terminal voltage during the high-speed operation is fixed is proposed. Therefore, if this method is used, it is possible to configure the d/q-axis current command generator also taking into account the fact that current saturation does not occur during the high-speed operation.

However, in the d/q-axis current command generator to which the technology described in Patent Document 2 is applied, it is necessary to generate a d-axis current command and a q-axis current command that satisfy both a voltage relational expression based on a motor equivalent circuit and a torque relational expression indicated by Formula (3). Therefore, there is a problem in that a considerably complex calculation is necessary and a burden on a product CPU is extremely large.

The present invention has been devised in view of the above and it is an object of the present invention to obtain a control apparatus for a permanent magnet synchronous motor capable of performing highly accurate torque control not only during the low-speed operation and the medium-speed operation but also during the high-speed operation without increasing a burden on a product CPU irrespective of whether the permanent magnet synchronous motor is the SPM motor or the IPM motor.

Means for Solving Problem

To achieve the above-mentioned object, a control apparatus for a permanent magnet synchronous motor according to the present invention includes: a d/q-axis current command generator that generates current commands on a d-axis and a q-axis from a torque command externally input; and a current controller that generates, according to proportional integral control, voltage commands on the d-axis and the q-axis for causing currents on the d-axis and the q-axis actually flowing to the permanent magnet synchronous motor to be matched with current correction commands on the d-axis and the q-axis, which are deviations between the current commands on the d-axis and the q-axis and current correction amounts on the d-axis and the q-axis corresponding to the current commands, and includes a torque correction circuit that generates a torque correction command from a current phase of the current correction commands on the d-axis and the q-axis and the torque command and supplies the torque correction command to the d/q-axis current command generator instead of the torque command.

Effect of the Invention

According to the present invention, the torque command externally input is input to the added torque correction circuit rather than being directly supplied to the d/q-axis current command generator. This added torque correction circuit generates, with a small calculation amount, the torque correction command using the torque command externally input and the current phases of the corrected current commands on the d-axis and the q-axis and supplies the torque correction command to the d/q-axis current generator. Consequently, the d/q-axis current command generator can generate current commands on the d-axis and the q-axis to reflect an actual operation state. Therefore, it is possible to generate appropriate current commands on the d-axis and the q-axis not only during the low-speed operation and the medium-speed operation but also during the high-speed operation irrespective of whether the permanent magnet synchronous motor is the SPM motor or the IPM motor. In other words, the present invention realizes an effect that highly accurate torque control can be performed in an entire operation region without increasing a burden on a product CPU.

EXPLANATIONS OF LETTERS OR NUMERALS

1 Current-phase calculating unit
2, 4 Torque correctors
3a, 3b, 3c Multipliers
5 Current-amplitude-change-rate calculating unit
9 d/q-axis current command generator
10, 11, 12, 13 Subtractors
14 d-axis current controller
15 q-axis current controller
16 Two-phase/three-phase coordinate converter
17 PWM inverter
18 Permanent magnet synchronous motor
19a, 19b, 19c Current detectors
20 Three-phase/two-phase coordinate converter
21 Speed detector
22 Coefficient multiplier
23 Integrator

BEST MODE(S) FOR CARRYING OUT THE INVENTION

Preferred embodiments of a control apparatus for a permanent magnet synchronous motor according to the present invention are explained in detail below with reference to the drawings.

First Embodiment

Figure 1:
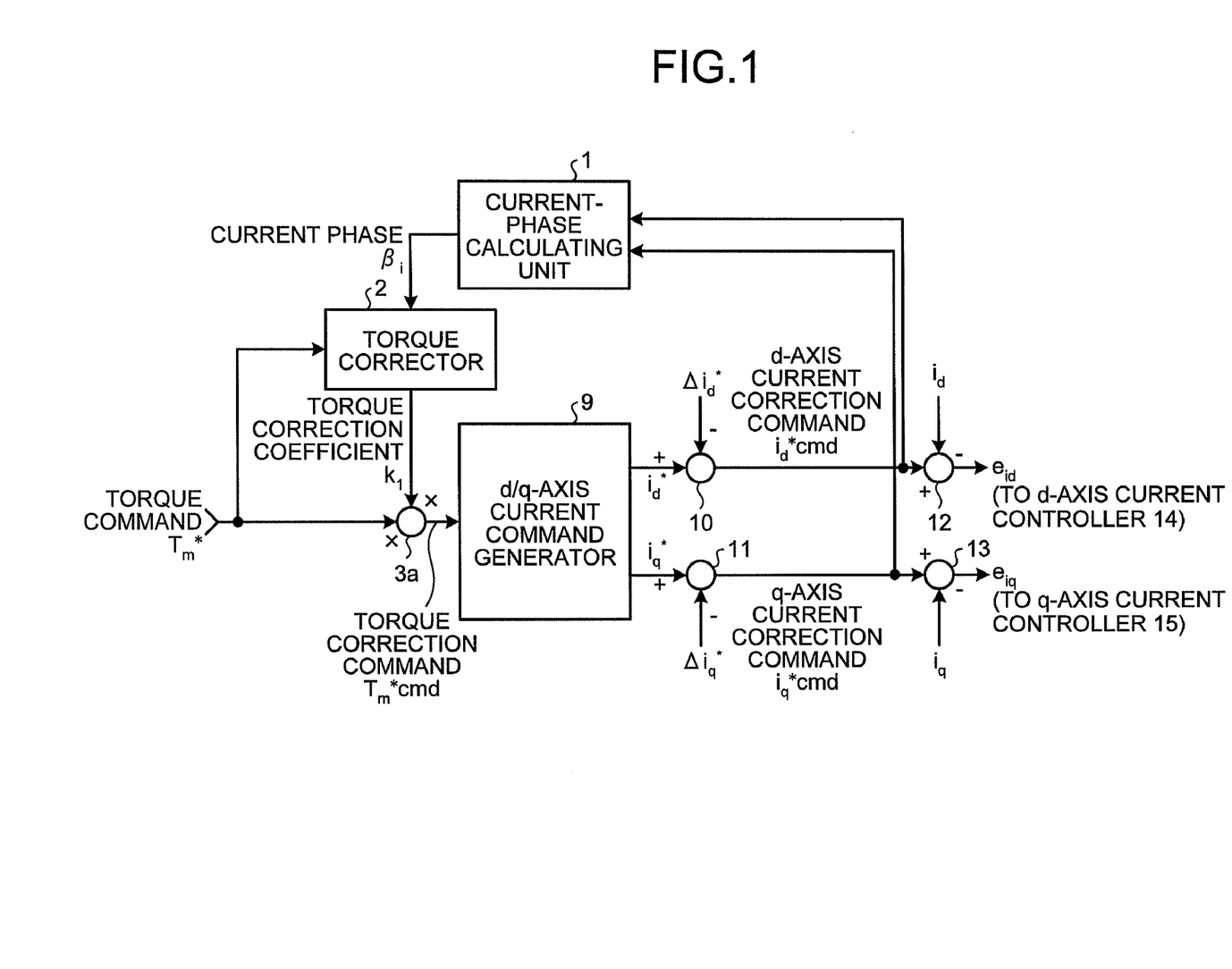
FIG. 1 is a block diagram showing a main part configuration of a control apparatus for a permanent magnet synchronous motor according to a first embodiment of the present invention.
Figure 2:
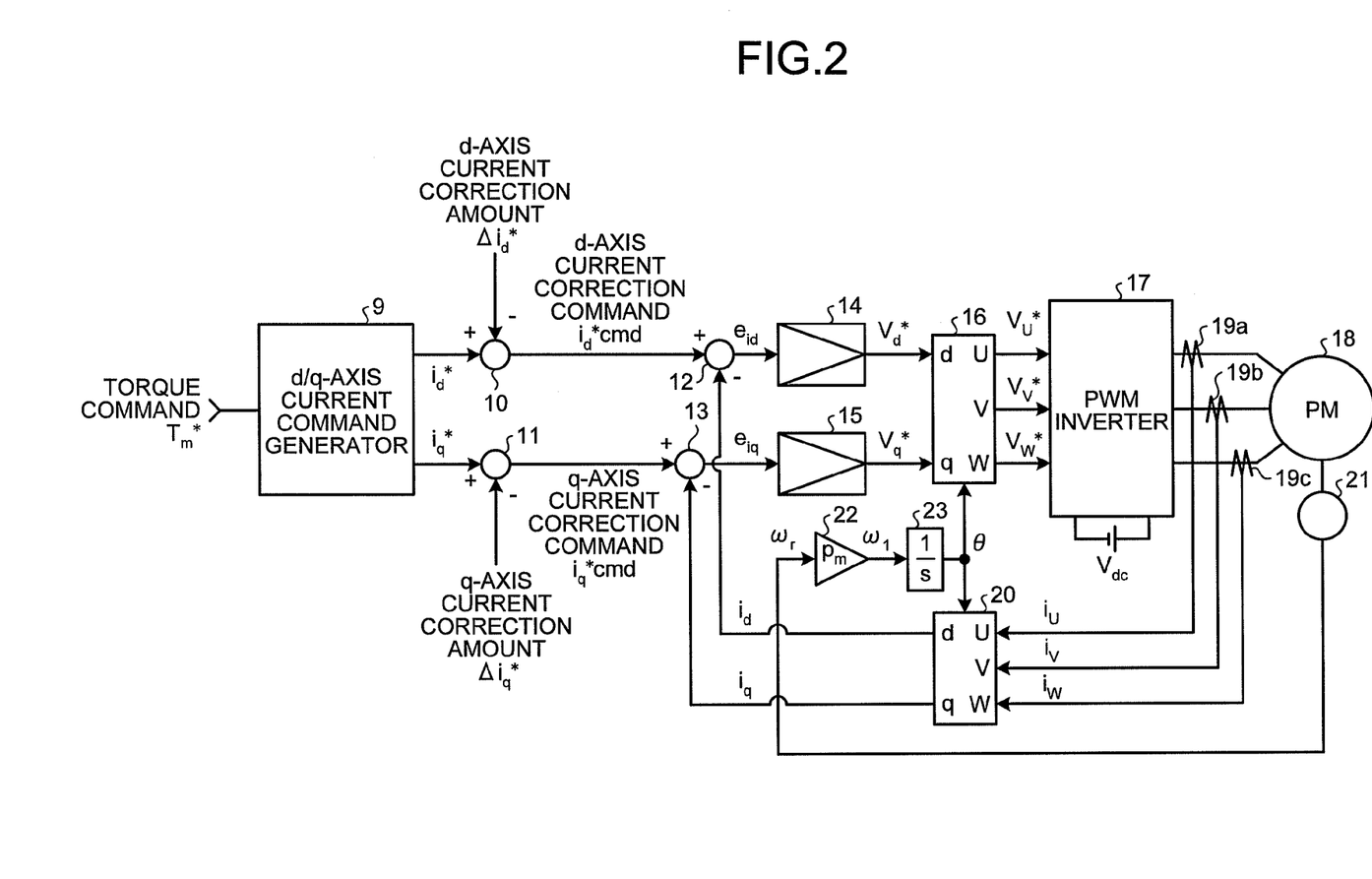
FIG. 2 is a block diagram showing a general configuration example of a control apparatus that performs field weakening control for the permanent magnet synchronous motor.

FIG. 1 is a block diagram showing a main part configuration of a control apparatus for a permanent magnet synchronous motor according to a first embodiment of the present invention. FIG. 2 is a block diagram showing a general configuration example of a control apparatus that performs field weakening control for the permanent magnetic synchronous motor.

The main part (a torque correction circuit) of the control apparatus for the permanent magnet synchronous motor according to the first embodiment shown in FIG. 1 includes a current-phase calculating unit 1, a torque corrector 2, and a multiplier 3a added to the conventional control apparatus that performs field weakening control shown in FIG. 2, to which the present invention is applied.

To facilitate understanding of the present invention, first, the configuration and the operation of the conventional control apparatus that performs the field weakening control, to which the present invention is applied, are briefly explained with reference to FIG. 2.

Thereafter, the operation of the main part configuration of the control apparatus according to the first embodiment is explained with reference to FIG. 1.

In FIG. 2, the conventional control apparatus that performs the field weakening control includes, as components for controlling a permanent magnet synchronous motor (PM) 18, a d/q-axis current command generator 9, subtractors 10, 11, 12, and 13, a d-axis current controller 14, a q-axis current controller 15, a two-phase/three-phase coordinate converter 16, a PWM inverter 17, current detectors 19a, 19b, and 19c, a three-phase/two-phase coordinate converter 20, a speed detector 21, a coefficient multiplier 22, and an integrator 23.

The PWM inverter 17 generates, based on voltage commands $V_U^*$, $V_V^*$, and $V_W^*$ input from the two-phase/three-phase coordinate converter 16, driving power supplied to the permanent magnet synchronous motor 18. Vdc denotes a bus voltage.

The speed detector 21 detects rotating speed $\omega_r$ of the driven permanent magnet synchronous motor 18. The coefficient multiplier 22 calculates rotational angular velocity $\omega_1$ of a dq-axis coordinate from the rotating speed $\omega_r$ detected by the speed detector 21. The integrator 23 integrates the rotational angular velocity $\omega_1$ of the dq-axis coordinate calculated by the coefficient multiplier 22 and outputs the integrated rotational angular velocity $\omega_1$ to the two-phase/three-phase coordinate converter 16 and the three-phase/two-phase coordinate converter 20 as a phase angle $\theta$ of the dq-axis coordinate.

The current detectors 19a, 19b, and 19c detect motor driving currents $i_U$, $i_V$, and $i_W$ supplied from the PWM inverter 17 to the permanent magnet synchronous motor 18 and outputs the motor driving currents $i_U$, $i_V$, and $i_W$ to the three-phase/two-phase coordinate converter 20.

The three-phase/two-phase coordinate converter 20 converts, based on the phase angle $\theta$ of the dq-axis coordinate input from the integrator 23, the motor driving currents $i_U$, $i_V$, and $i_W$ detected by the current detectors 19a, 19b, and 19c into a d-axis current $i_d$ and a q-axis current $i_q$ on the dq-axis coordinate and outputs the d-axis current $i_d$ and the q-axis current $i_q$ to the corresponding subtractors 12 and 13.

The d/q-axis current command generator 9 performs the calculation of Formula (2) or Formula (3) according to an arbitrary torque command $T_m^*$ externally input and generates a d-axis current command $i_d^*$ and a q-axis current command $i_q^*$ on the dq-axis coordinate of rotating orthogonal two axes. The d/q-axis current command generator 9 outputs the d-axis current command $i_d^*$ to one input terminal of the subtractor 10 and outputs the q-axis current command $i_q^*$ to one input terminal of the subtractor 11.

A d-axis current correction amount $\Delta i_d$ is input to the other input terminal of the subtractor 10 and a q-axis current correction amount $\Delta i_q$ is input to the other input terminal of the subtractor 11. A generation source of the d-axis current correction amount $\Delta i_d$ and the q-axis current correction amount $\Delta i_q$ is not shown; however, the d-axis current correction amount $\Delta i_d$ and the q-axis current correction amount $\Delta i_q$ are generated by applying the method proposed in Patent Document 1 (FIG. 11). The method is not described here.

The subtractor 10 calculates a deviation between the d-axis current command $i_d^*$ and the d-axis current correction amount $\Delta i_d$ and outputs the deviation to one input terminal of the subtractor 12 as a d-axis current correction command $i_d^*$cmd. The d-axis current $i_d$ is input to the other input terminal of the subtractor 12 from the three-phase/two-phase coordinate converter 20. The subtractor 11 calculates a deviation between the q-axis current command $i_q^*$ and the q-axis current correction amount $\Delta i_q$ and outputs the deviation to one input terminal of the subtractor 13 as a q-axis current correction command $i_q^*$cmd. The q-axis current $i_q$ is input to the other input terminal of the subtractor 13 from the three-phase/two-phase coordinate converter 20.

The subtractor 12 calculates a deviation between the d-axis current correction command $i_d^*$cmd and the d-axis current $i_d$ and outputs the deviation to the d-axis current controller 14 as a current deviation $e_{id}$. The subtractor 13 calculates a deviation between the q-axis current correction command $i_q^*$cmd and the q-axis current $i_q$ and outputs the deviation to the q-axis current controller 15 as a current deviation $e_{iq}$.

The d-axis current controller 14 and the q-axis current controller 15 are respectively IP controllers that perform proportional integral (PI) control. The d-axis current controller 14 and the q-axis current controller 15 respectively generate, by performing the PI control, a d-axis voltage command $V_d^*$ and a q-axis voltage command $V_q^*$, which are operation amounts for reducing the current deviations $e_{id}$ and $e_{iq}$ input from the subtractors 12 and 13 to zero, and output the d-axis voltage command $V_d^*$ and the q-axis voltage command $V_q^*$ to the two-phase/three-phase coordinate converter 16.

The two-phase/three-phase coordinate converter 16 converts, based on the phase angle $\theta$ on the dq-axis coordinate input from the integrator 23, the d-axis voltage command $V_d^*$ and the q-axis voltage command $V_q^*$ input from the d-axis current controller 14 and the q-axis current controller 15 into the voltage commands $V_U^*$, $V_V^*$, and $V_W^*$ and outputs the voltage commands $V_U^*$, $V_V^*$, and $V_W^*$ to the PWM inverter 17.

As explained above, in the vector control for performing the field weakening control, the d-axis current $i_d$ and the q-axis current $i_q$ actually supplied to the permanent magnet synchronous motor 18 are controlled by the current controllers (the d-axis current controller 14 and the q-axis current controller 15) so as to be respectively matched with the d-axis current correction command $i_d^*$cmd and the q-axis current correction command $i_q^*$cmd.

A main part configuration of the control apparatus according to the first embodiment is explained with reference to FIG. 1. The current-phase calculating unit 1 receives, as inputs, the outputs (the d-axis current correction command $i_d^*$cmd and the q-axis current correction command $i_q^*$cmd) of the subtractors 10 and 11 and outputs a current phase $\beta_i$ to the torque corrector 2.

The torque corrector 2 receives, as inputs, the torque correction command $T_m^*$ from the outside and the current phase β_i from the current-phase calculating unit 1 and outputs the torque correction coefficient k_1 to the multiplier 3a.

The multiplier 3a receives, as inputs, the torque command T_m* from the outside and the torque correction coefficient k_1 from the torque corrector 2 and outputs a torque correction command T_m*cmd to the d/q-axis current command generator 9.

The operation of the main part of the control apparatus according to the first embodiment is explained below. The d/q-axis current command generator 9 is originally provided to realize torque control for the permanent magnet synchronous motor 18. However, there is a need for performing the field weakening control to suppress occurrence of voltage saturation during high-speed operation and realize stable operation.

Therefore, as shown in FIG. 2, a configuration for supplying the d-axis current correction amount $\Delta i_d^*$ and the q-axis current correction amount $\Delta i_q^*$ and correcting the d-axis current command $i_d^*$ and the q-axis current command $i_q^*$ output by the d/q-axis current command generator 9 is adopted. Then, in an IPM motor in particular, generated torque substantially changes and accuracy of the torque control falls. These are explained above.

Thus, in the first embodiment, to realize highly accurate torque control, instead of directly supplying the torque command T_m* from the outside to the d/q-axis current command generator 9, the torque command T_m* from the outside is corrected using the current phase β_i, which is of the corrected current commands on the d-axis and the q-axis (the d-axis current correction command $i_d^*$cmd and q-axis current correction command $i_q^*$cmd), and the corrected torque command is given to the d/q-axis current command generator 9.

Specifically, the current-phase calculating unit 1 applies the d-axis current correction command $i_d^*$cmd output by the subtractor 10 and the q-axis current correction command $i_q^*$cmd output by the subtractor 11 to the following Formula (4) to calculate the current phase β_i and outputs the current phase β_i to the torque corrector 2.

$$\beta_i = \tan^{-1}\left(\frac{i_d^*cmd}{i_q^*cmd}\right) \quad (4)$$

The torque corrector 2 generates the torque correction coefficient k_1 based on the torque command T_m* from the outside and the current phase β_i from the current-phase calculating unit 1 and outputs the torque correction coefficient k_1 to one input terminal of the multiplier 3a. Because the torque correction coefficient k_1 can be calculated by performing an experiment in advance, the torque correction coefficient k_1 can be stored in a memory as table data. In the first embodiment, this method is used.

Figure 3:
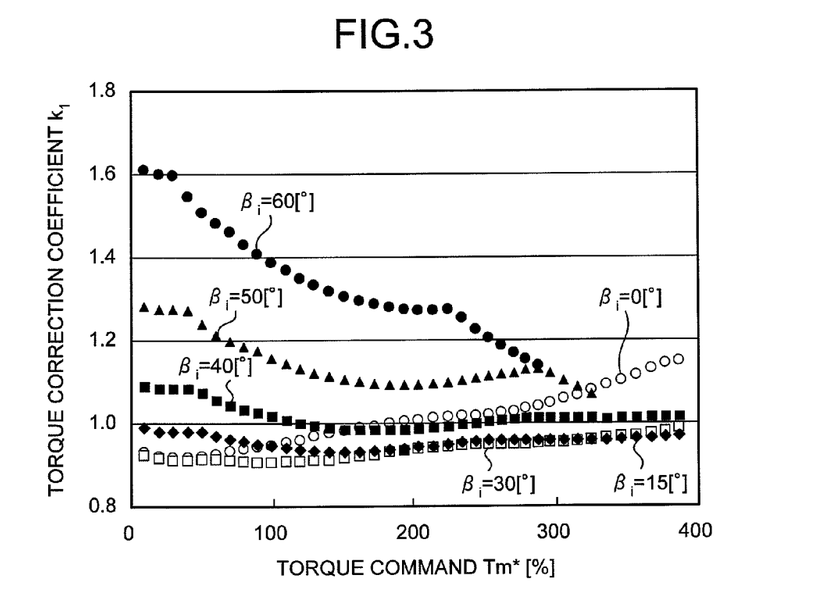
FIG. 3 is a diagram showing an example of table data of a torque correction coefficient $k_1$ shown in FIG. 1.

FIG. 3 is a diagram showing an example of the table data of the torque correction coefficient k_1 shown in FIG. 1. In FIG. 3, the abscissa represents the torque command T_m*[%] and the ordinate represents the torque correction coefficient k_1. Several characteristic curves corresponding to values of the current phase β_i[°] (in FIG. 3, six characteristic curves corresponding to β_i=60[°], β_i=50[°], β_i=40[°], βP_i=30[°], β_i=15[°], and β_i=0[°]) are shown. These characteristic curves are created by inputting values of the torque command T_m* and the current phase β_i and, when necessary, carrying out interpolation or the like.

The torque corrector 2 is configured to input, as address information, the values of the torque command T_m* from the outside and the current phase β_i from the current-phase calculating unit 1 to the memory that stores the table data shown in FIG. 3, extract the torque correction coefficient k_1 plotted on the ordinate, and output the torque correction coefficient k_1 to the multiplier 3a. It goes without saying that the torque corrector 2 can store the table data shown in FIG. 3 in a form of a function and derive the torque correction coefficient k_1 by performing a calculation.

The multiplier 3a multiplies together the torque command T_m* from the outside and the torque correction coefficient k_1 from the torque corrector 2 and outputs a result of the multiplication to the d/q-axis current command generator 9 as the torque correction command T_m*cmd.

In this way, because a calculation amount in the added correction circuits (the current-phase calculating unit 1, the torque corrector 2, and the multiplier 3a) is small, it can be said that an increase in a burden applied to a product CPU is small.

In the first embodiment, the d/q-axis current command generator 9 generates, instead of the torque command T_m* from the outside, the d-axis current command $i_d^*$ and the q-axis current command $i_q^*$ from the corrected torque correction command T_m*cmd. Consequently, for example, operation characteristics shown in FIG. 4 are obtained.

Figure 4:
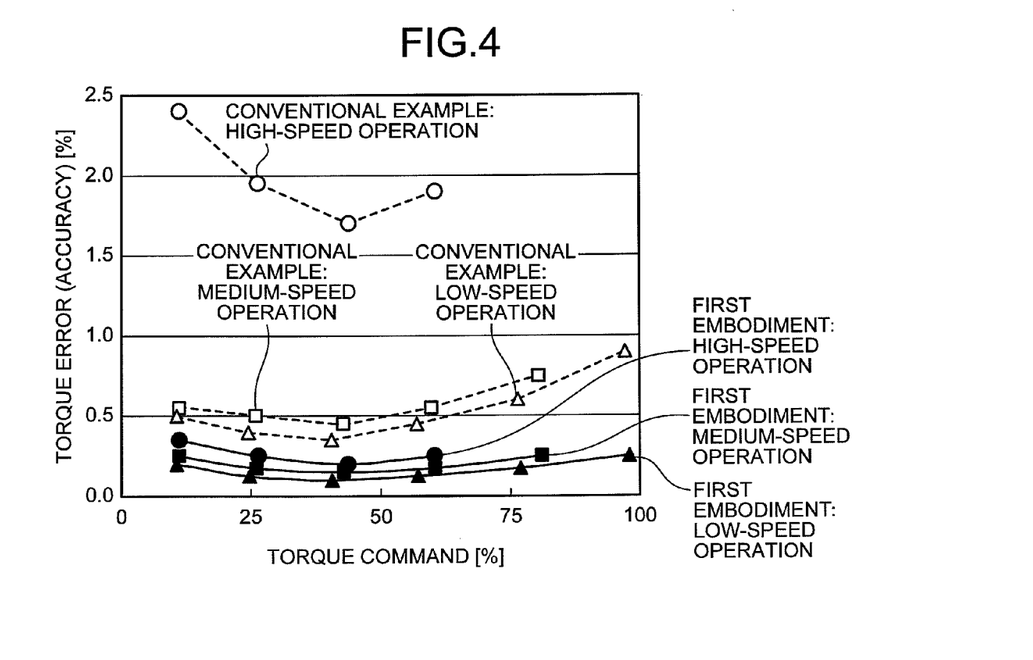
FIG. 4 is a characteristic chart in which operation characteristics obtained when the first embodiment is applied to an IPM motor are shown in comparison with a conventional example.

FIG. 4 is a characteristic chart in which operation characteristics obtained when the first embodiment is applied to the IPM motor are shown in comparison with an conventional example. In FIG. 4, operation characteristics of high-speed operation, medium-speed operation, and low-speed operation obtained when the first embodiment (FIG. 1) is applied to the IPM motor and operation characteristics of high-speed operation, medium-speed operation, and low-speed operation obtained when the conventional example (FIG. 2) is applied to the IPM motor are shown.

In FIG. 4, the abscissa represents a torque command [%] and the ordinate represents a torque error (accuracy) [%]. The operation characteristics shown in FIG. 4 are plotted by defining a difference between the magnitude of the torque command plotted on the abscissa and a value of actually output torque as the torque error. It is assumed that, when the torque error is zero, in the permanent magnet synchronous motor 18, output conforming to the torque command is performed and torque control accuracy is the highest.

As shown in FIG. 4, in the conventional example (FIG. 2), the accuracy of the torque control falls when the high-speed operation is performed. On the other hand, it is seen that, in the first embodiment (FIG. 1), highly accurate torque control can be performed even when the high-speed operation is performed. It is seen that, in the first embodiment, the accuracy of the torque control can also be improved in the low-speed operation and the medium-speed operation.

As explained above, according to the first embodiment, the torque command T_m* input from the outside is input to the added correction circuits rather than being directly supplied to the d/q-axis current command generator 9. The added correction circuits derive, with a small calculation amount, the torque correction coefficient k_1 using the current phase β_i of the corrected d-axis current command and the q-axis current command, corrects the torque command T_m* using the torque correction coefficient k_1, and gives the corrected torque command to the d/q-axis current command generator 9.

Consequently, the d/q-axis current command generator 9 can generate current commands on the d-axis and the q-axis to reflect an actual operation states. Therefore, the d/q-axis current command generator 9 can generate appropriate current commands on the d-axis and the q-axis not only during the low-speed operation and the medium-speed operation but also during the high-speed operation irrespective of whether the permanent magnet synchronous motor 18 is an SPM motor or an IPM motor. Therefore, it is possible to perform highly accurate torque control in an entire operation region without increasing a burden on a product CPU.

In the first embodiment, there is also obtained an advantage that it is possible to accurately estimate a value of actually generated torque by multiplying a torque value, which is calculated by applying the d-axis current $i_d$ and the q-axis current $i_q$ actually flowing to the permanent magnet synchronous motor 18 to Formula (3), with an inverse of the torque correction coefficient $k_1$.

Second Embodiment

Figure 5:
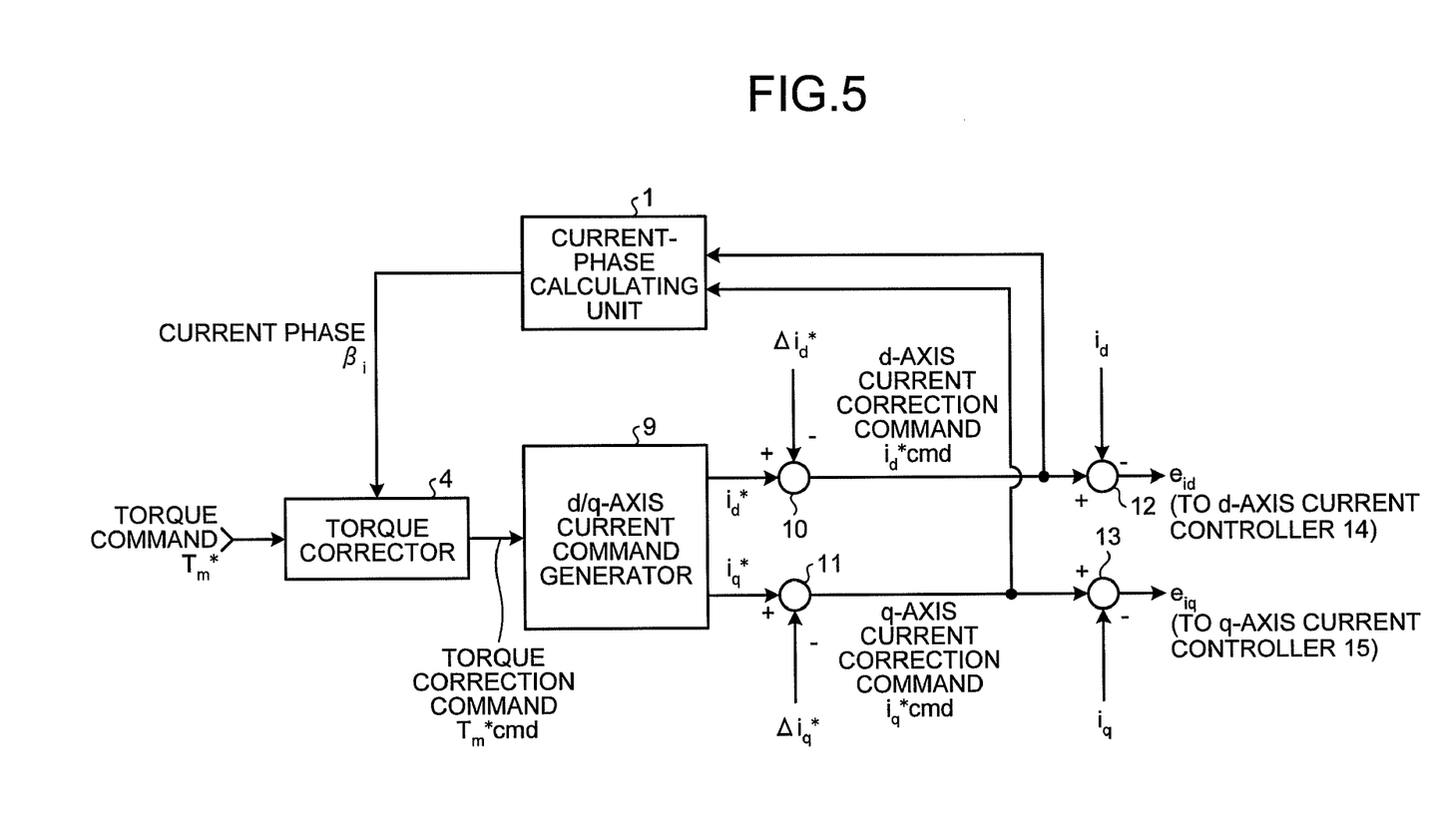
FIG. 5 is a block diagram showing a main part configuration of a control apparatus for a permanent magnet synchronous motor according to a second embodiment of the present invention.

FIG. 5 is a block diagram showing a main part configuration of a control apparatus for a permanent magnet synchronous motor according to a second embodiment of the present invention. In FIG. 5, components same as or equivalent to the components shown in FIG. 1 (the first embodiment) are denoted by the same reference numerals and signs. Sections related to the second embodiment are mainly explained below.

In the main part (a torque correction circuit) of the control apparatus for the permanent magnet synchronous motor according to the second embodiment shown in FIG. 5, a torque corrector 4 is provided instead of the torque corrector 2 and the multiplier 3a in the configuration shown in FIG. 1 (the first embodiment). With this configuration, a multiplier can be made unnecessary. Therefore, it is possible to further reduce an overall calculation amount and further reduce a burden applied to a product CPU.

The torque corrector 4 directly generates the torque correction command $T_m^*cmd$ based on the torque command $T_m^*$ from the outside and the current phase $\beta_i$ from the current-phase calculating unit 1 and outputs the torque correction command $T_m^*cmd$ to the d/q-axis current command generator 9. Because the torque correction command $T_m^*cmd$ can be calculated by performing an experiment in advance, the torque correction command $T_m^*cmd$ can be stored in a memory as table data. In the second embodiment, this method is used.

Figure 6:
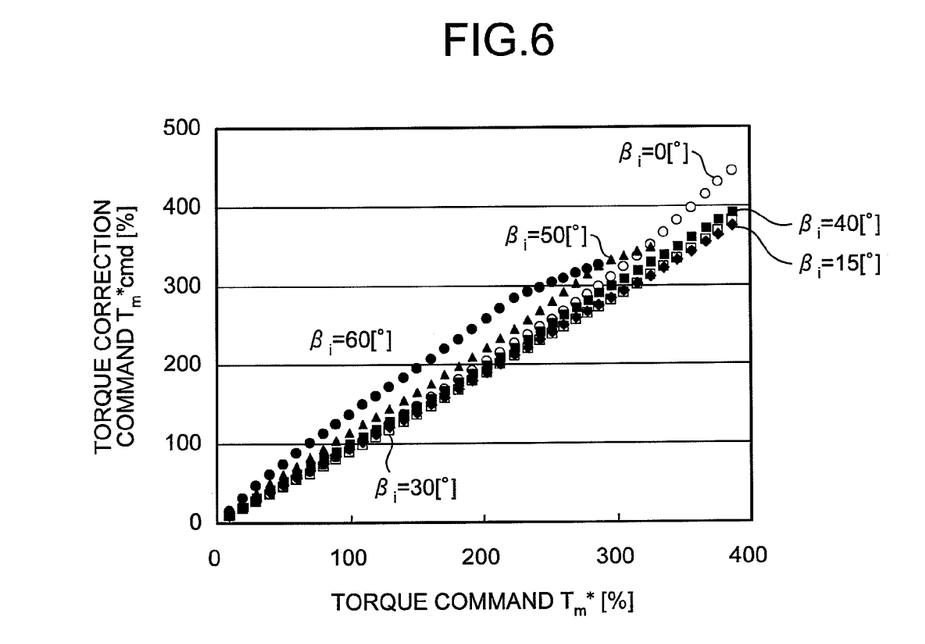
FIG. 6 is a diagram showing an example of table data of a torque correction command $T_m$*cmd shown in FIG. 5.

FIG. 6 is a diagram showing an example of the table data of the torque correction command $T_m^*cmd$ shown in FIG. 5. In FIG. 6, the abscissa represents the torque command $T_m^*[\%]$ and the ordinate represents the torque correction command $T_m^*cmd[\%]$. Several characteristic curves corresponding to values of the current phase $\beta_i[°]$ (in FIG. 6, six characteristic curves corresponding to $\beta_i=60[°]$, $\beta_i=50[°]$, $\beta_i=40[°]$, $\beta_i=30[°]$, $\beta_i=15[°]$, and $\beta_i=0[°]$) are shown. These characteristic curves are created by inputting values of the torque command $T_m^*$ and the current phase $\beta_i$ and, when necessary, carrying out interpolation or the like.

The torque corrector 4 is configured to input, as address information, the values of the torque command $T_m^*$ from the outside and the current phase $\beta_i$ from the current command generator 1 to the memory that stores the table data shown in FIG. 6, extract the torque correction command $T_m^*cmd$ plotted on the ordinate, and output the torque correction command $T_m^*cmd$ to the d/q-axis current command generator 9. It goes without saying that the torque corrector 4 can store the table data shown in FIG. 6 in a form of a function and derive the torque correction command $T_m^*cmd$ by performing a calculation.

As explained above, according to the second embodiment, operations and effects same as those in the first embodiment are obtained. In addition, because the torque correction coefficient $k_1$ is not calculated and the torque correction command $T_m^*cmd$ is directly calculated, it is possible to further reduce an overall calculation amount and further reduce a burden applied to a product CPU than in the first embodiment.

Third Embodiment

Figure 7:
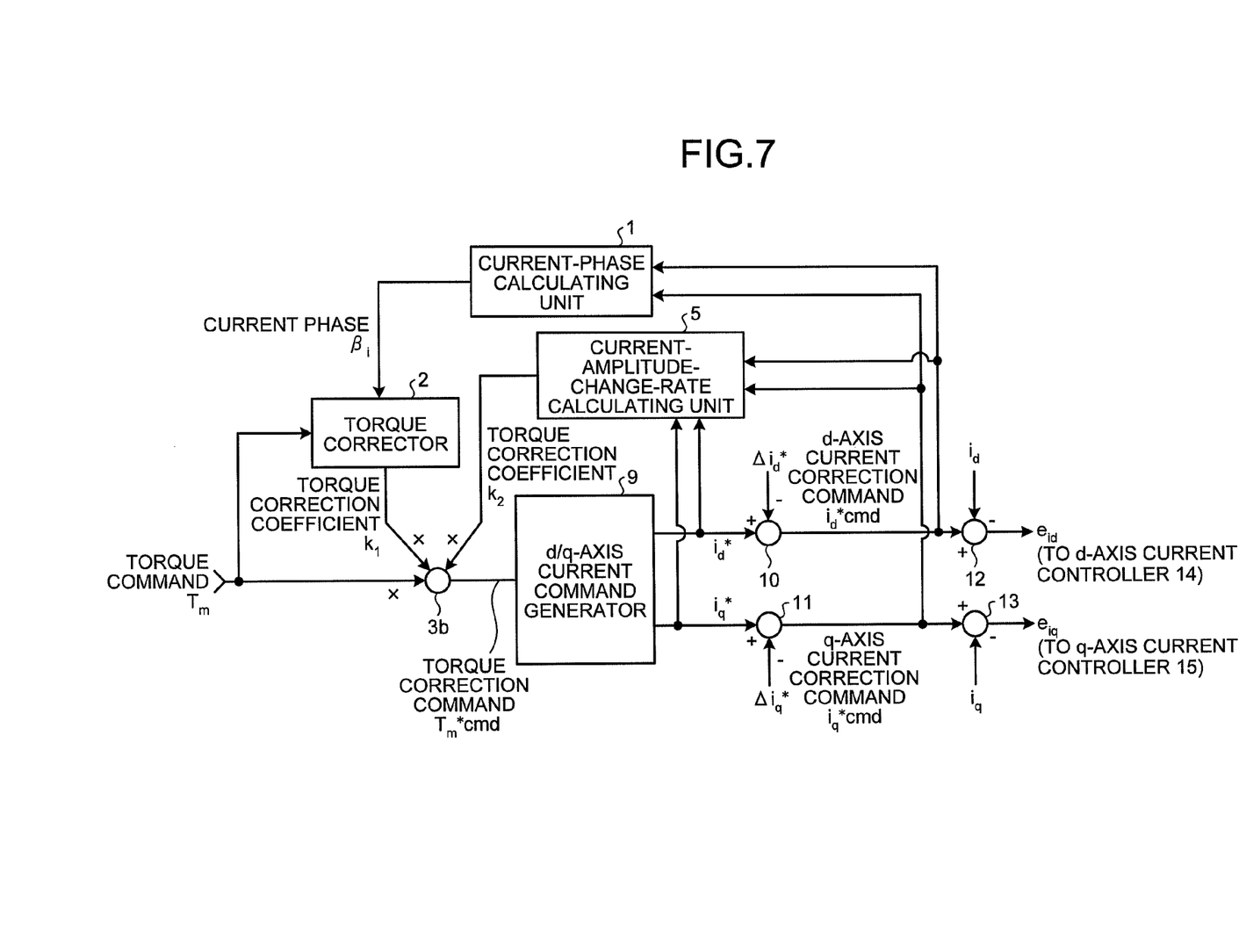
FIG. 7 is a block diagram showing a main part configuration of a control apparatus for a permanent magnet synchronous motor according to a third embodiment of the present invention.

FIG. 7 is a block diagram showing a main part configuration of a control apparatus for a permanent magnet synchronous motor according to a third embodiment of the present invention. In FIG. 7, components same as or equivalent to the components shown in FIG. 1 (the first embodiment) are denoted by the same reference numerals and signs. Sections related to the third embodiment are mainly explained below.

In the main part (a torque correction circuit) of the control apparatus for the permanent magnet synchronous motor according to the third embodiment shown in FIG. 7, a current-amplitude-change-rate calculating unit 5 is added and a multiplier 3b is provided instead of the multiplier 3a in the configuration shown in FIG. 1 (the first embodiment).

The current-amplitude-change-rate calculating unit 5 receives, as inputs, the d-axis current command $i_d^*$, the q-axis current command $i_q^*$, the d-axis current correction command $i_d^*cmd$, and the q-axis current correction command $i_q^*cmd$ and outputs a torque correction coefficient (a second torque correction coefficient) $k_2$ to the multiplier 3b.

The multiplier 3b receives, as inputs, the torque command $T_m^*$ from the outside, the torque correction coefficient (a first torque correction coefficient) $k_1$ from the torque corrector 2, and the torque correction coefficient (the second torque correction coefficient) $k_2$ from the current-amplitude-change-rate calculating unit 5 and outputs the torque correction command $T_m^*cmd$ to the d/q-axis current command generator 9.

The operation of the main part of the control apparatus according to the third embodiment is explained below. In the first and second embodiments explained above, the method of correcting the torque command $T_m^*$ from the outside using the current phase $\beta_i$ of the corrected current commands (the d-axis current correction command $i_d^*cmd$ and the q-axis current correction command $i_q^*cmd$) on the d-axis and the q-axis is explained.

However, because the d-axis current correction amount $\Delta i_d$ and the q-axis current correction amount $\Delta i_q^*$ are supplied, not only the current phase $\beta_i$ but also the current amplitude of the current phase $\beta_i$ naturally changes. In some case, torque changes because of the influence of the change in the current amplitude and accuracy of torque control falls.

Therefore, in the third embodiment, to realize more highly accurate torque control, the torque command $T_m^*$ from the outside is corrected using as well a rate of change in the amplitude of the current commands on the d-axis and the q-axis.

Specifically, the current-amplitude-change-rate calculating unit 5 applies the d-axis current command $i_d^*$, the q-axis current command $i_q^*$, the d-axis current correction command $i_d^*cmd$, and the q-axis current correction command $i_q^*cmd$ to the following Formula (5) to calculate a rate of change between current amplitude before the correction and current amplitude after the correction and outputs the rate of change to the multiplier 3b as the torque correction command $k_2$.

$$k_2 = \sqrt{\frac{(i_d^*)^2 + (i_q^*)^2}{(i_d^*cmd)^2 + (i_q^*cmd)^2}} \quad (5)$$

The multiplier 3b multiplies together the torque command $T_m^*$ from the outside, the torque correction coefficient $k_1$ from the torque corrector 2, and the torque correction coefficient $k_2$ from the current-amplitude-change-rate calculating unit 5 and outputs a result of the multiplication to the d/q-axis current command generator 9 as the torque correction command $T_m$*cmd.

As explained above, according to the third embodiment, the torque correction coefficient $k_1$ is derived by using the current phase $\beta_i$ of the corrected d-axis current command and the q-axis current command, a rate of change between current amplitudes before and after the correction of the d-axis current command and the q-axis current command is further derived, and the torque command $T_m$* is corrected according to the torque correction coefficient $k_1$ and the rate of change and given to the d/q-axis current command generator 9. Therefore, it is possible to perform more highly accurate torque control than in the first and second embodiments.

Fourth Embodiment

Figure 8:
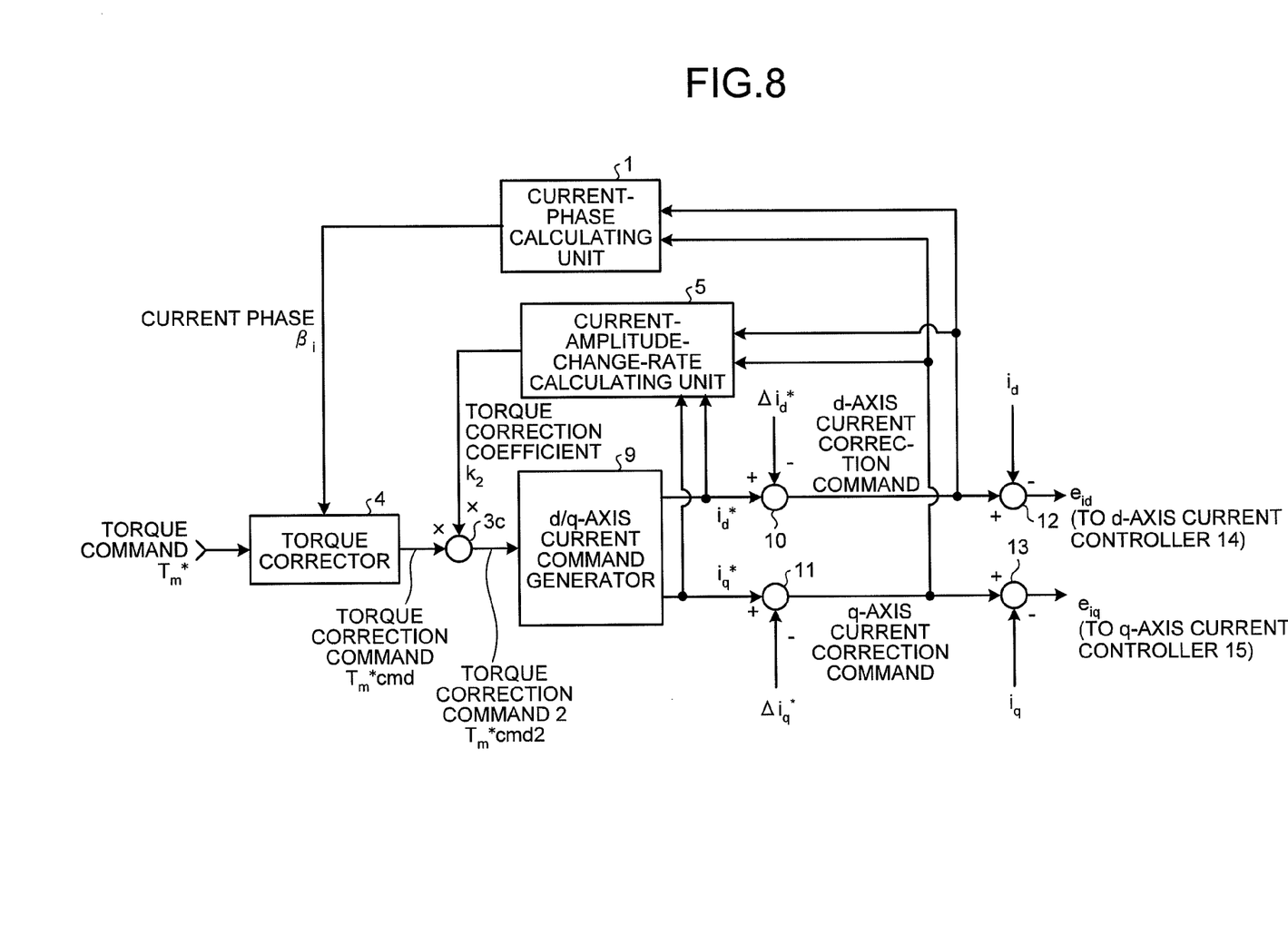
FIG. 8 is a block diagram showing a main part configuration of a control apparatus for a permanent magnet synchronous motor according to a fourth embodiment of the present invention.

FIG. 8 is a block diagram showing a main part configuration of a control apparatus for a permanent magnet synchronous motor according to a fourth embodiment of the present invention. In FIG. 8, components same as or equivalent to the components shown in FIG. 7 (the third embodiment) are denoted by the same reference numerals and signs. Sections related to the fourth embodiment are mainly explained.

In the main part (a torque correction circuit) of the control apparatus for the permanent magnet synchronous motor according to the fourth embodiment shown in FIG. 8, the torque corrector 4 shown in FIG. 5 (the second embodiment) is provided instead of the torque corrector 2 and a multiplier 3c is provided instead of the multiplier 3b in the configuration shown in FIG. 7 (the third embodiment).

The torque corrector 4 receives, as inputs, the torque command $T_m$* from the outside and the current phase $\beta_i$ from the current-phase calculating unit 1 and outputs the torque correction command (a first torque correction command) $T_m$*cmd.

The multiplier 3c receives, as inputs, the torque correction command (the first torque correction command) $T_m$*cmd from the torque corrector 4 and the torque correction coefficient $k_2$ from the current-amplitude-change-rate calculating unit 5 and outputs a torque correction command (a second torque correction command) $T_m$*cmd2 to the d/q-axis current command generator 9.

The operation of the main part of the control apparatus according to the fourth embodiment is explained below. As explained with reference to FIG. 5 (the second embodiment), the torque corrector 4 directly generates the torque correction command $T_m$*cmd from the current phase $\beta_i$ from the current-phase calculating unit 1 and the torque command $T_m$* from the outside, and outputs it to the d/q-axis current command generator 9. With this configuration, it is possible to reduce a burden applied to a product CPU as in the second embodiment.

The multiplier 3c multiplies together the torque correction command (the first torque correction command) $T_m$*cmd from the torque corrector 4 and the torque correction coefficient $k_2$ from the current-amplitude-change-rate calculating unit 5 and outputs a result of the multiplication to the d/q-axis current command generator 9 as the torque correction command (the second torque correction command) $T_m$*cmd2.

As explained above, according to the fourth embodiment, the operations and the effects in the third embodiment are obtained. In addition, because the torque correction command (the first torque correction command) $T_m$*cmd is calculated without obtaining the torque correction coefficient $k_1$ in FIG. 7 (in the third embodiment), it is possible to reduce an overall calculation amount and further reduce a burden applied to a product CPU than in the third embodiment.

Industrial Applicability

As explained above, the control apparatus for the permanent magnet synchronous motor according to the present invention is useful as a control apparatus for a permanent magnet synchronous motor capable of performing highly accurate torque control not only during the low-speed operation and the medium-speed operation but also during the high-speed operation without increasing a burden on a product CPU irrespective of whether the permanent magnet synchronous motor is the SPM motor or the IPM motor.

The invention claimed is:

1. A control apparatus for a permanent magnet synchronous motor including: a d/q-axis current command generator that generates current commands on a d-axis and a q-axis from a torque command externally input; and a current controller that generates, according to proportional integral control, voltage commands on the d-axis and the q-axis for causing currents on the d-axis and the q-axis actually flowing to the permanent magnet synchronous motor to be matched with current correction commands on the d-axis and the q-axis, which are deviations between the current commands on the d-axis and the q-axis and current correction amounts on the d-axis and the q-axis corresponding to the current commands, the control apparatus comprising a torque correction circuit that generates a torque correction command from a current phase of the current correction commands on the d-axis and the q-axis and the torque command and supplies the torque correction command to the d/q-axis current command generator instead of the torque command.

2. The control apparatus for a permanent magnet synchronous motor according to claim 1, wherein the torque correction circuit includes: a current-phase calculating unit that calculates a current phase from the current correction commands on the d-axis and the q-axis; a torque corrector that outputs a torque correction coefficient from the torque command and the current phase; and a multiplier that multiplies together the torque command and the torque correction coefficient and outputs the torque correction command.

3. The control apparatus for a permanent magnet synchronous motor according to claim 1, wherein the torque correction circuit includes: a current-phase calculating unit that calculates a current phase from the current correction commands on the d-axis and the q-axis; and a torque corrector that outputs the torque correction command from the torque command and the current phase.

4. A control apparatus for a permanent magnet synchronous motor including: a d/q-axis current command generator that generates current commands on a d-axis and a q-axis from a torque command externally input; and a current controller that generates, according to proportional integral control, voltage commands on the d-axis and the q-axis for causing currents on the d-axis and the q-axis actually flowing to the permanent magnet synchronous motor to be matched with current correction commands on the d-axis and the q-axis, which are deviations between the current commands on the d-axis and the q-axis and current correction amounts on the d-axis and the q-axis corresponding to the current commands, the control apparatus comprising a torque correction circuit that generates a torque correction command from a current phase and a current amplitude of the current correction commands on the d-axis and the q-axis and the torque command and supplies the torque correction command to the d/q-axis current command generator instead of the torque command.

5. The control apparatus for a permanent magnet synchronous motor according to claim 4, wherein the torque correction circuit includes: a current-phase calculating unit that calculates a current phase from the current correction commands on the d-axis and the q-axis; a torque corrector that outputs a first torque correction coefficient from the torque command and the current phase; a current-amplitude-change-rate calculating unit that calculates a rate of change between amplitude of the current commands on the d-axis and the q-axis and amplitude of the current correction commands on the d-axis and the q-axis and outputs the rate of change as a second torque correction coefficient; and a multiplier that multiplies together the torque command, the first torque correction coefficient, and the second torque correction coefficient and outputs the torque correction command.

6. The control apparatus for a permanent magnet synchronous motor according to claim 4, wherein the torque correction circuit includes: a current-phase calculating unit that calculates a current phase from the current correction commands on the d-axis and the q-axis; a torque corrector that outputs a first torque correction command from the torque command and the current phase; a current-amplitude-change-rate calculating unit that calculates a rate of change between amplitude of the current commands on the d-axis and the q-axis and amplitude of the current correction commands on the d-axis and the q-axis and outputs the rate of change as a torque correction coefficient; and a multiplier that outputs, as the torque correction command supplied to the d/q-axis current command generator, a second torque correction command obtained by multiplying together the torque command, the first torque correction command, and the torque correction coefficient.

* * * * *